US007753680B2

(12) United States Patent
Nakashima

(10) Patent No.: US 7,753,680 B2
(45) Date of Patent: Jul. 13, 2010

(54) WATER-DISCOLORING DRAWING TOY AND WATER-DISCOLORING DRAWING TOY SET INCLUDING THE SAME

(75) Inventor: Akio Nakashima, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 498 days.

(21) Appl. No.: 11/706,386

(22) Filed: Feb. 15, 2007

(65) Prior Publication Data

US 2007/0190893 A1 Aug. 16, 2007

(30) Foreign Application Priority Data

Feb. 15, 2006 (JP) ............................ 2006-037332

(51) Int. Cl.
*G09B 11/00* (2006.01)

(52) U.S. Cl. ........................................................ 434/84

(58) Field of Classification Search .................. 434/81, 434/84, 85, 88, 98, 408, 409, 410; 446/146
See application file for complete search history.

(56) References Cited

U.S. PATENT DOCUMENTS 5,163,846 A * 11/1992 Lee ........................... 434/408
5,219,625 A * 6/1993 Matsunami et al. ........... 428/30
5,441,418 A * 8/1995 Brown et al. .................. 434/85
5,775,914 A * 7/1998 Smith .......................... 434/85
6,196,848 B1 * 3/2001 Yamazaki ................... 434/409
6,416,853 B1 * 7/2002 Nakashima et al. ...... 428/313.9
6,953,345 B1 10/2005 Nakashima et al.
2002/0150737 A1 * 10/2002 Nakashima ................ 428/195

* cited by examiner

*Primary Examiner*—Kurt Fernstrom
(74) *Attorney, Agent, or Firm*—Sughrue Mion, PLLC

(57) ABSTRACT

To provide: a water-discoloring drawing toy which, when a writing utensil or applicator for water adhesion is applied thereto, produces a multicolor image and which eliminates the monotonous production of monochromatic images in a related-art technique and is rich in unexpectedness and changes; and a water-discoloring drawing toy set including this drawing toy.

A water-discoloring drawing toy 1 having such a constitution that a drawing made by applying a writing utensil or applicator for water adhesion produces a multicolor image, the drawing toy comprising: a substrate; many non-discoloring images differing in color tone and adjoining each other disposed on the substrate so that at least two color tones per 100 $cm^2$ can be visually recognized in the part having the non-discoloring images; and a porous layer for preventing the non-discoloring images from being seen in the ordinary state, the porous layer being disposed over the non-discoloring images and comprising a binder resin and a low-refractive-index pigment fixed therein in a dispersed state, the porous layer having a difference in transparency between a liquid-impregnated state and an unimpregnated state. Also provided is a water-discoloring drawing toy set which comprises the water-discoloring drawing toy 1 and a writing utensil 3 or applicator for water adhesion.

4 Claims, 4 Drawing Sheets

WATER-DISCOLORING DRAWING TOY AND WATER-DISCOLORING DRAWING TOY SET INCLUDING THE SAME

TECHNICAL FIELD

The present invention relates to a water-discoloring drawing toy having such a constitution that application of a writing utensil or applicator for water adhesion produces a multicolor image. The invention further relates to a water-discoloring drawing toy set including the drawing toy.

BACKGROUND ART

A water-discoloring toy has been disclosed which comprises a substrate and, formed thereon, a porous layer which comprises a binder resin and a low-refractive-index pigment fixed therein in a dispersed state and has a difference in transparency between a liquid-impregnated state and an unimpregnated state (U.S. Pat. No. 6,953,345).

In this prior-art sheet, the lower layer is hidden when the porous layer is in a dry state (unimpregnated state), and this porous layer can be transparentized by impregnating the layer with a liquid, e.g., water, to produce an image having the color tone of the lower layer. However, images obtained in this manner are limited to ones having a single color tone. Even though the sheet can be repeatedly used, images which can be produced are reproductions of the image. The prior-art sheet has hence been unsatisfactory in unexpectedness and niceties of change.

DISCLOSURE OF THE INVENTION

Problem that the Invention is to Solve

An object of the invention, which eliminates the drawback of that water-image sheet, is to provide a water-discoloring drawing toy which produces a multicolor image to satisfy unexpectedness and the niceties of change. Another object of the invention is to provide a water-discoloring drawing toy set including the drawing toy.

Means for Solving the Problem

The invention provides a water-discoloring drawing toy having such a constitution that a drawing made by applying a writing utensil or applicator for water adhesion produces a multicolor image, the drawing toy comprising: a substrate; many non-discoloring images differing in color tone and adjoining each other disposed on the substrate so that at least two color tones per 100 $cm^2$ can be visually recognized in the part having the non-discoloring images; and a porous layer for preventing the non-discoloring images from being seen in the ordinary state, the porous layer being disposed over the non-discoloring images and comprising a binder resin and a low-refractive-index pigment fixed therein in a dispersed state, the porous layer having a difference in transparency between a liquid-impregnated state and an unimpregnated state.

This water-discoloring drawing toy may have the following embodiments: the non-discoloring images are strip-form non-discoloring images; the strip-form non-discoloring images have a strip width of 0.3-10 cm; the strip-form non-discoloring images are nonlinear; the non-discoloring images are polygonal non-discoloring images; the polygonal non-discoloring images have a maximum side length of 0.5-10 cm; and the non-discoloring images contain colorants and the colorants are color pigments having a particle diameter of 0.01-10 μm.

The invention further provides a water-discoloring drawing toy set which comprises the water-discoloring drawing toy described above and a writing utensil or applicator for water adhesion.

The water-discoloring drawing toy set may have the following embodiments: the writing utensil or applicator employs as a writing tip member a porous plastic object having interconnected pores or an object formed by fiber processing; and the writing utensil or applicator, when applied, gives a drawing which has a width in the range of 0.3-15 cm.

Advantage of the Invention

The invention can provide a water-discoloring drawing toy which, when a writing utensil or applicator for water adhesion is applied thereto, produces a multicolor image having a difference in color tone between adjoining non-discoloring images and which hence eliminates the monotonous production of monochromatic images in the related-art technique and is rich in unexpectedness and changes. The invention can further provide a water-discoloring drawing toy set including this drawing toy.

DESCRIPTION OF REFERENCE NUMERALS

Figure 1:
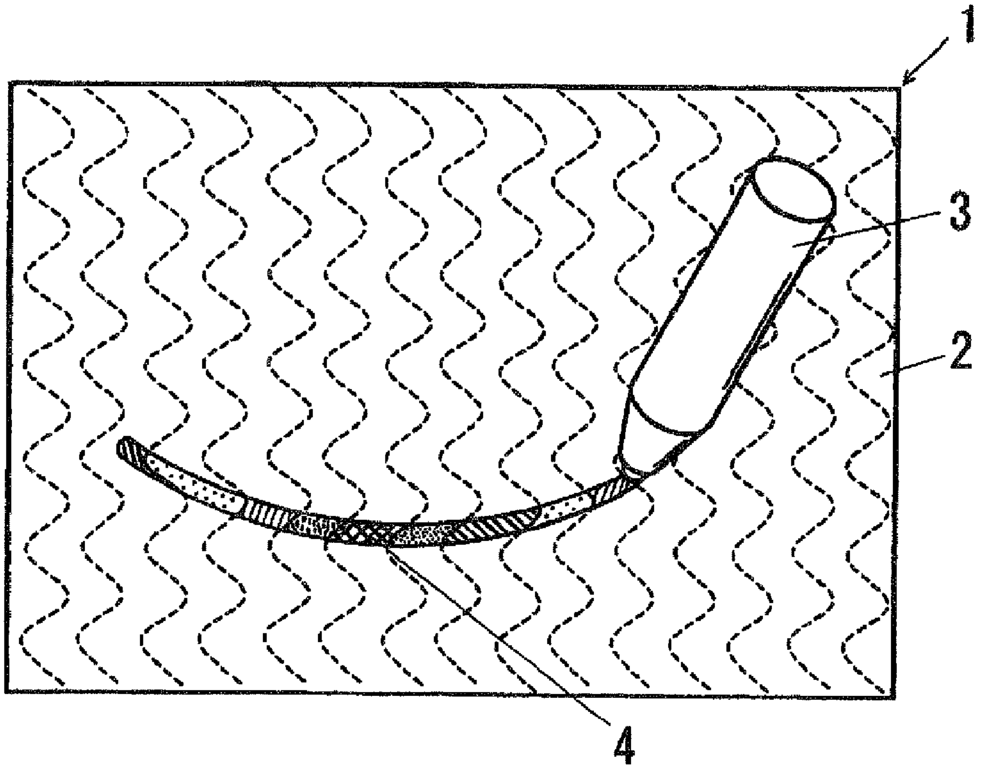
FIG. 1 illustrates one embodiment of the water-discoloring drawing toy of the invention, and shows the state of an image produced with a writing utensil.

1 water-discoloring drawing toy
2 porous layer
3 writing utensil
4 multicolor image

BEST MODE FOR CARRYING OUT THE INVENTION

Any base having printability can be effectively used as the substrate. Examples of the substrate include paper, synthetic papers, fabrics such as woven fabrics, knitted fabrics, braided fabrics, and nonwoven fabrics, natural or artificial leathers, plastics, glasses, clayware, metals, woods, and stones. With respect to the shape of the substrate, a flat one is preferred. However, one having recesses and protrusions may also be used.

The non-discoloring images formed on the substrate are many non-discoloring images differing in color tone and adjoining each other disposed so that at least two colors per 100 $cm^2$ can be visually recognized in the part having the non-discoloring images.

In this kind of drawing toy, the size thereof and the drawing width of the tip part of the writing utensil or applicator are limited to sizes in a practical range. In view of this, the non-discoloring images are arranged so that at least two colors appear per 100 $cm^2$ in order for a multicolor image to appear in any desired position when the drawing toy is used. In a system in which a multicolor image appears only when an area larger than 100 $cm^2$ is discolored, the probability that a multicolor image appears in any desired position is low and the effect of discoloration is low.

The non-discoloring images may be images of any of various geometrical shapes. Examples thereof include strip-form non-discoloring images and polygonal non-discoloring images.

The strip-form non-discoloring images formed on the substrate may be linear or curved, strip-form non-discoloring images differing in color tone and adjoining each other.

With respect to the shape of the strip-form non-discoloring images, it is preferred that the images be nonlinear (curved) strip-form non-discoloring images which are apt to produce a multicolor image even when a drawing is made in any of various directions. With respect to strip width, it is preferred that the strip-form non-discoloring images be ones having the same strip width size or a combination of different strip width sizes selected from the range of 0.3-10 cm, preferably 0.3-5 cm, more preferably 0.5-5 cm.

The polygonal non-discoloring images may be polygons each having n sides (n is an integer of 3 or larger), such as a triangle, quadrilateral, pentagon, hexagon, etc., differing in color tone disposed so as to adjoin each other, Such polygonal non-discoloring images may be adjoining polygons equal in the number n, or may be adjoining polygons differing in the number n. However, in order for the color tones of the non-discoloring images to be more bright and be balanced, the non-discoloring images preferably are many regular n-side polygons disposed so as to adjoin each other which are equal in the number n, such as equilateral triangles, squares, regular pentagons, or regular hexagons. The polygons equal in the number n and the polygons differing in the number n may have the same size or may be polygons differing in size.

With respect to the size of the polygonal non-discoloring images, the polygonal non-discoloring images preferably are ones having a maximum side length of 0.5-10 cm, preferably 0.5-7.5 cm, more preferably 0.5-5 cm, from the standpoint of facilitating the formation of a multicolor image even when a drawing is made in any of various directions.

The areas where the non-discoloring images adjoin each other may have a constitution which includes no overlaps so as to have clear boundaries. However, it is preferred that non-discoloring images should have overlaps and have gradation attributable to the color tones of the adjoining images. This constitution moderates color tone differences between the non-discoloring images and facilitates the hiding of the non-discoloring images by the porous layer. As a result, a water-discoloring drawing toy having an excellent contrast between a dry state and a liquid-impregnated state can be obtained.

The color tones of the non-discoloring images are preferably selected from yellow, blue, pink, and mixtures of any two of the yellow, blue, and pink colors. The substrate preferably has a white or light color with a lightness $V_B$ of 8.0 or higher, and the relationship between this lightness and the lightness of each non-discoloring image $V_C$ preferably satisfies $V_B - V_C > 0$.

The yellow color has a maximum absorption wavelength ($\lambda_{max}$) of 430-480 nm, the blue color has a maximum absorption wavelength of 580-600 nm, and the pink color has a maximum absorption wavelength of 480-500 nm.

When the lightness values are satisfied, the color tones of the non-discoloring images are brightly and clearly recognized.

In particular, when the boundaries between adjoining images have gradation, the contrast between the dry state and liquid-impregnated state of the porous film becomes poor because the gradation results in a reduced color density. Consequently, to satisfy the lightness values is an important requirement in order for the bright color tones of the gradation parts to be visually recognized. Furthermore, when gradation parts are formed using non-discoloring inks having light-transmitting properties, the gradation parts have bright color tones and a drawing toy is obtained which is rich in changes according to the dry state or liquid-impregnated state of the porous layer.

In case where the lightness of the substrate $V_B$ is lower than 8.0 or where $V_B - V_C \leqq 0$, the non-discoloring images have dark colors and are difficult to be hidden by the porous layer or the drawing toy is less apt to show clear bright changes. Consequently, the commercial value of the toy is apt to be impaired.

The non-discoloring images may be constituted of a binder resin and one or more color pigments fixed therein which have a particle diameter of 0.01-10 μm, preferably 0.05-5.0 μm. The non-discoloring images having this constitution have moderate transparency. In particular, even when the images are constituted of color mixtures, bright color tones can be visually recognized.

In case where the particle diameter of the color pigments is smaller than 0.01 μm, the non-discoloring images are too transparent and are apt to be influenced by the color of the underlying substrate. In addition, application of water to the porous layer is apt to cause migration into the porous layer. In case where the particle diameter thereof exceeds 10 μm, the non-discoloring images have poor transparency and bright color mixtures are difficult to obtain. In addition, such images have poor surface smoothness and failures of hiding by the porous layer are apt to result. A sufficient effect of discoloration is hence difficult to obtain.

The porous layer disposed over the non-discoloring images is a layer formed by fixing one or more low-refractive-index pigments in a dispersed state together with a binder resin. This layer has a difference in transparency between a dry state and a liquid-impregnated state.

Examples of the low-refractive-index pigments include silicic acid and salts thereof, baryta powder, barium sulfate, barium carbonate, calcium carbonate, gypsum, clay, talc, alumina white, and magnesium carbonate. These substances each have a refractive index in the range of 1.4-1.8 and come to have satisfactory transparency upon water absorption.

Examples of the salts of silicic acid include aluminum silicate, aluminum potassium silicate, aluminum sodium silicate, aluminum calcium silicate, potassium silicate, calcium silicate, calcium sodium silicate, sodium silicate, magnesium silicate, and magnesium potassium silicate.

A combination of two or more of those low-refractive-index pigments may be used.

Although such low-refractive-index pigments are not particularly limited in particle diameter, it is preferred to use ones having a particle diameter of 0.03-10.0 μm.

Preferred examples of the low-refractive-index pigment include silicic acid.

The silicic acid may be one produced by a dry process. However, silicic acid produced by a wet process (hereinafter referred to as wet-process silicic acid) is especially effective. An explanation on this point is given below. Silicic acid is produced as noncrystalline amorphous silicic acid. According to production processes, silicic acid products are roughly classified into two groups, i.e., ones produced by a dry process in which a vapor-phase reaction such as, e.g., the pyrolysis of a silicon halide, e.g., silicon tetrachloride, is used (hereafter referred to as dry-process silicic acid) and ones produced by a wet process in which a liquid-phase reaction such as, e.g., the decomposition of, e.g., sodium silicate with an acid is used. Dry-process silicic acid differs from wet-process silicic acid in structure. Dry-process silicic acid has a three-dimensional structure constituted of densely bonded silicic acid molecules. In contrast, wet-process silicic acid has two-dimensional structure parts each comprising a long segment formed by the condensation of silicic acid molecules.

Consequently, wet-process silicic acid has a sparser molecular structure than dry-process silicic acid. It is presumed that, due to this difference in molecular structure, a porous layer containing wet-process silicic acid is excellent in irregular light reflection in a dry state and hence has higher hiding power in the ordinary state as compared with a porous layer containing dry-process silicic acid.

Furthermore, compared to dry-process silicic acid, wet-process silicic acid has a larger amount of hydroxyl groups present as silanol groups on the particle surface and has a higher degree of hydrophilicity. In view of the use of the drawing toy in which the porous layer is impregnated with water, it is therefore preferred to use wet-process silicic acid.

For the purpose of regulating the ordinary-state hiding power of the porous layer and the transparency of the layer in a liquid-impregnated state, another general-purpose low-refractive-index pigment may be used in combination with the wet-process silicic acid.

The amount of the low-refractive-index pigment to be applied as a component of the porous layer is preferably 1-30 g/m$^2$, more preferably 5-20 g/m$^2$, from the standpoint of satisfying both of ordinary-state hiding power and transparency in a liquid-impregnated state, although the amount thereof is governed by the particle diameter, specific surface area, oil absorption, etc. In case where the amount of the pigment is smaller than 1 g/m$^2$, it is difficult to obtain sufficient ordinary-state hiding power. In case where the amount thereof exceeds 30 g/m$^2$, it is difficult to obtain sufficient transparency in a liquid-impregnated state.

The low-refractive-index pigment is dispersed in a vehicle containing a binder resin as a binding agent. This dispersion is applied to a substrate on which the non-discoloring images have been formed, and then dried to remove the volatile ingredient and thereby form a porous layer.

Examples of the binder resin include urethane resins, nylon resins, vinyl acetate resins, acrylic ester resins, acrylic ester copolymer resins, acrylic polyol resins, vinyl chloride/vinyl acetate copolymer resins, maleic acid resins, polyester resins, styrene resins, styrene copolymer resins, polyethylene resins, polycarbonate resins, epoxy resins, styrene/butadiene copolymer resins, acrylonitrile/butadiene copolymer resins, methyl methacrylate/butadiene copolymer resins, butadiene resins, chloroprene resins, melamine resins, emulsions of these resins, casein, starch, cellulose derivatives, poly(vinyl alcohol), urea resins, and phenolic resins.

The proportion of the low-refractive-index pigment to such a binder resin is governed by the kind and properties of the low-refractive-index pigment. However, the amount of the binder resin on a solid basis is preferably 0.5-2 parts by weight, more preferably 0.8-1.5 parts by weight, per part by weight of the low-refractive-index pigment. In case where the amount of the binder resin on a solid basis is smaller than 0.5 parts by weight per part by weight of the low-refractive-index pigment, it is difficult to impart practical film strength to the porous layer. In case where the amount thereof exceeds 2 parts by weight, the porous layer has impaired water permeability.

The proportion of the binder resin to the colorant in the porous layer is lower than in general coating films. A sufficient film strength is hence difficult to obtain. Consequently, use of a nylon resin or a urethane resin among the binder resins enumerated above is effective in enhancing abrasion resistance.

Examples of the urethane resin include polyester urethane resins, polycarbonate urethane resins, and polyether urethane resins. Two or more of these may be used in combination. Also usable are a urethane resin emulsion which is an emulsion of any of these resins in water and a colloidal (ionomer type) urethane resin prepared by dissolving or dispersing an ionic urethane resin (urethane ionomer) by means of self-emulsification based on the ionic groups thereof without necessitating an emulsifying agent.

Although those urethane resins may be either water-based or oil-based urethane resins, it is preferred in the invention to use water-based urethane resins, especially urethane resin emulsions or colloidal urethane resins.

One or more of those urethane resins may be used as the only binder resin. However, they may be used in combination with one or more other binder resins according to the kind of the substrate and the performances required of the film. In the case where a urethane resin is used in combination with other binder resin(s), the content of the urethane resin in the porous layer is preferably 30% by weight or higher based on all binder resins in the layer on a solid basis from the standpoint of obtaining a practical film strength.

When a crosslinkable binder resin among the aforementioned binder resins is used, any desired crosslinking agent may be added to crosslink the resin. Thus, the film strength can be further improved.

Some of the binder resins mentioned above have a high affinity for water, while others have a low affinity therefor. By using a suitable combination of two or more of these, the porous layer can be regulated with respect to the time period required for water to infiltrate thereinto, the degree of infiltration, and the rate of drying after infiltration. Furthermore, a dispersant and a surfactant can be suitably added to control the infiltration performances.

For forming the porous layer over the non-discoloring images, use can be made of a printing technique such as screen printing, offset printing, gravure printing, coater printing, dabber printing, and transfer printing or a coating technique such as brush coating, spray coating, electrostatic coating, electrodeposition, curtain coating roller coating, or dip coating.

The drawing toy produces a multicolor image having at least two different colors when a writing utensil or applicator for water adhesion is applied thereto to make a drawing having such a length or size that the drawing extends across adjoining non-discoloring images. Upon drying, the multicolor image disappears and the drawing toy returns to the ordinary state.

Examples of devices for adhering water to the porous layer of the drawing toy include a writing utensil or applicator having bristles, a fibrous writing part, or the like at the tip, a writing utensil or applicator which has a container for containing water therein and a fibrous object or brush for drawing out water from the container, and an applicator in a roller form.

A combination of such a writing utensil or applicator and the water-discoloring drawing toy gives a water-discoloring drawing toy set.

A preferred writing utensil or applicator is one which has a container for containing water therein and employs, as a writing tip member for drawing out water from the container, a porous plastic object having interconnected pores or an object formed by fiber processing. With this writing utensil or applicator, a drawing can be easily made and utility can be heightened.

The porous plastic object having interconnected pores or the object formed by fiber processing is not particularly limited as long as it absorbs water in an appropriate amount and discharges it. Examples thereof include a porous object having interconnected pores and made of any of various plastics such as polyolefins, polyurethanes, polyesters, and other plastics, a hair pencil type writing tip member made up of fibers bound together, one obtained by the resin processing or thermal fusion processing of fibers, and one in a felt or nonwoven-fabric form. The shape and size thereof can be selected at will according to purposes.

The drawing which is made on the porous layer of the drawing toy by applying the writing utensil or applicator may have a width of 0.3-15 cm, and the width thereof is preferably 0.5-10 cm, more preferably 0.5-5 cm.

In case where the width thereof is smaller than 0.3 cm, the multicolor image is apt to have impaired visibility. When the width thereof exceeds 15 cm, there are cases where the niceties of change with the formation of multicolor images by drawing are impaired.

The writing utensil or applicator may be used in combination with a stamping device, spray can, stencil sheet, or the like.

EXAMPLES

The invention will be explained below by reference to Examples, but the invention should not be construed as being limited to these Examples. In the following Examples, all parts are by weight. The values of lightness were measured with a color-difference meter [color-difference meter Type TC3600, manufactured by Tokyo Denshoku Co., Ltd.].

Example 1 (see FIG. 1)

Non-discoloring inks of purple, blue, green, yellow, orange, and red colors were used to form wavy strip-form non-discoloring images on the upper surface of a white nylon taffeta fabric (lightness, 9.6) as a substrate. The non-discoloring images formed were closely disposed, strip-form bent images each having a width of 2 cm.

The parts respectively bearing the purple non-discoloring image, blue non-discoloring image, green non-discoloring image, yellow non-discoloring image, orange non-discoloring image, and red non-discoloring image had lightnesses of 4.7, 4.2, 6.0, 9.2, 6.0, and 5.0, respectively. The boundaries between the adjoining non-discoloring images were expressed by dot gradation.

Subsequently, a white screen printing ink prepared by evenly mixing, with stirring, 15 parts of wet-process silicic acid [trade name, Nipsil E-200; manufactured by Nippon Silica Industrial Co., Ltd.], 30 parts of a urethane emulsion [trade name, Hydran HW-930; manufactured by Dainippon Ink & Chemicals, Inc.; solid content 50%], 40 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface with a 100-mesh screen printing plate. The ink applied was dried and cured at 130° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including purple, blue, green, yellow, orange, and red areas connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of a nylon resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 1.5 cm is visually recognized.

Furthermore, as the porous layer dries, the image becomes invisible. When water is adhered to the porous layer again, a multicolor image is visually recognized.

Example 2 (see FIG. 1)

Non-discoloring inks (inks prepared by dispersing a color pigment having an average particle diameter of 1.0 μm in an acrylic resin emulsion) of yellow, pink, and blue colors, red and orange colors each as a yellow/pink color mixture, and purple color as a pink/blue color mixture were used to form wavy strip-form non-discoloring images on the upper surface of a white nylon taffeta fabric (lightness, 9.6) as a substrate. The non-discoloring images formed were closely disposed, strip-form bent images each having a width of 1.5 cm.

The parts respectively bearing the yellow non-discoloring image, pink non-discoloring image, blue non-discoloring image, red non-discoloring image, orange non-discoloring image, and purple non-discoloring image had lightnesses of 9.2, 5.5, 4.2, 5.0, 6.0, and 4.7, respectively. The boundaries between the adjoining non-discoloring images were constituted of dot gradation.

Subsequently, a white screen printing ink prepared by evenly mixing, with stirring, 15 parts of wet-process silicic acid [trade name, Nipsil E-200; manufactured by Nippon Silica Industrial Co., Ltd.], 30 parts of a urethane emulsion [trade name, Hydran HW-930; manufactured by Dainippon Ink & Chemicals, Inc.; solid content 50%], 40 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface with a 100-mesh screen printing plate. The ink applied was dried and cured at 130° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including yellow, orange, red, pink, purple, and blue areas connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of a nylon resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 1 cm is visually recognized.

Furthermore, as the porous layer dries, the image becomes invisible. When water is adhered to the porous layer again, a multicolor image is visually recognized.

Figure 2:
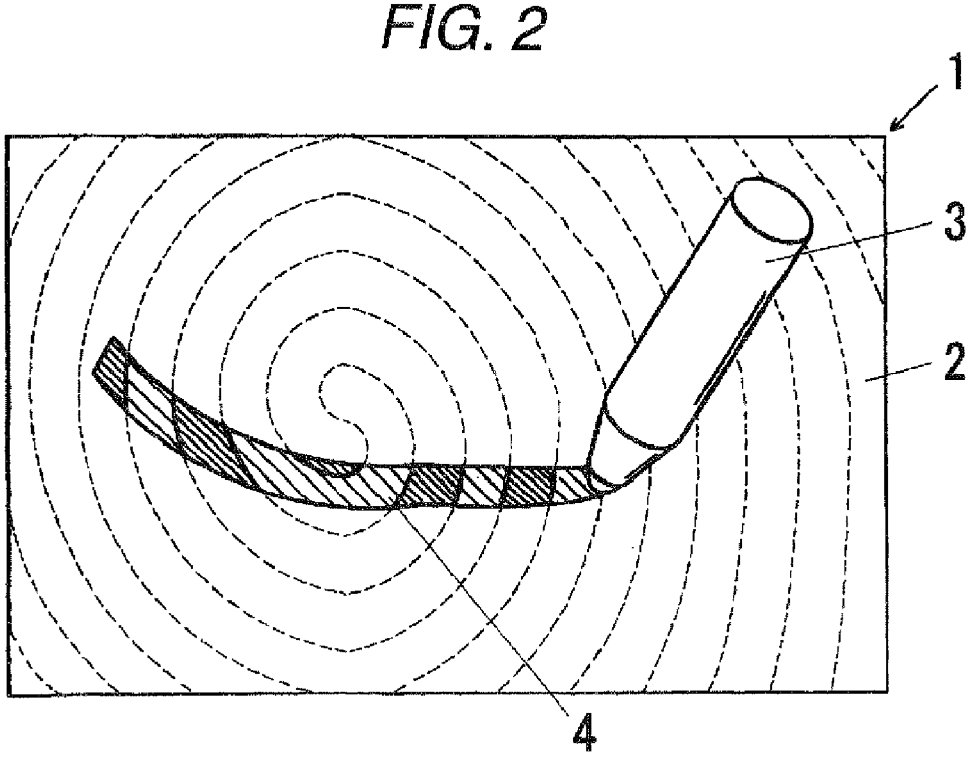
FIG. 2 illustrates another embodiment of the water-discoloring drawing toy of the invention, and shows the state of an image produced with a writing utensil.

Example 3 (see FIG. 2)

Non-discoloring inks (inks prepared by dispersing a color pigment having an average particle diameter of 0.05 μm in a polyester resin solution) of blue and red colors were used to form spiral strip-form non-discoloring images on the upper surface of a white polyester film having a thickness of 50 μm (lightness, 9.5) as a substrate. The non-discoloring images formed were closely disposed, strip-form bent images each having a width of 0.5 cm.

The parts respectively bearing the blue non-discoloring image and the red non-discoloring image had lightnesses of 4.0 and 4.8, respectively.

Subsequently, a white screen printing ink prepared by evenly mixing, with stirring, 15 parts of wet-process silicic acid [trade name, Nipsil E-200; manufactured by Nippon Silica Industrial Co., Ltd.], 50 parts of a urethane emulsion [trade name, Hydran HW-350; manufactured by Dainippon Ink & Chemicals, Inc.; solid content 30%], 40 parts of water, 0.5 parts of a silicone antifoamer, 3 parts of a thickener for water-based inks, 1 part of ethylene glycol, and 3 parts of an isocyanate crosslinking agent was used to conduct solid printing on the whole surface with a 100-mesh screen printing plate. The ink applied was dried and cured at 70° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part or the porous layer became transparent and a multicolor image 4 (drawing) including blue and red areas connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of a polyester resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 0.2 cm is visually recognized.

Furthermore, as the porous layer dries, the image becomes invisible. When water is adhered to the porous layer again, a multicolor image is visually recognized.

Figure 3:
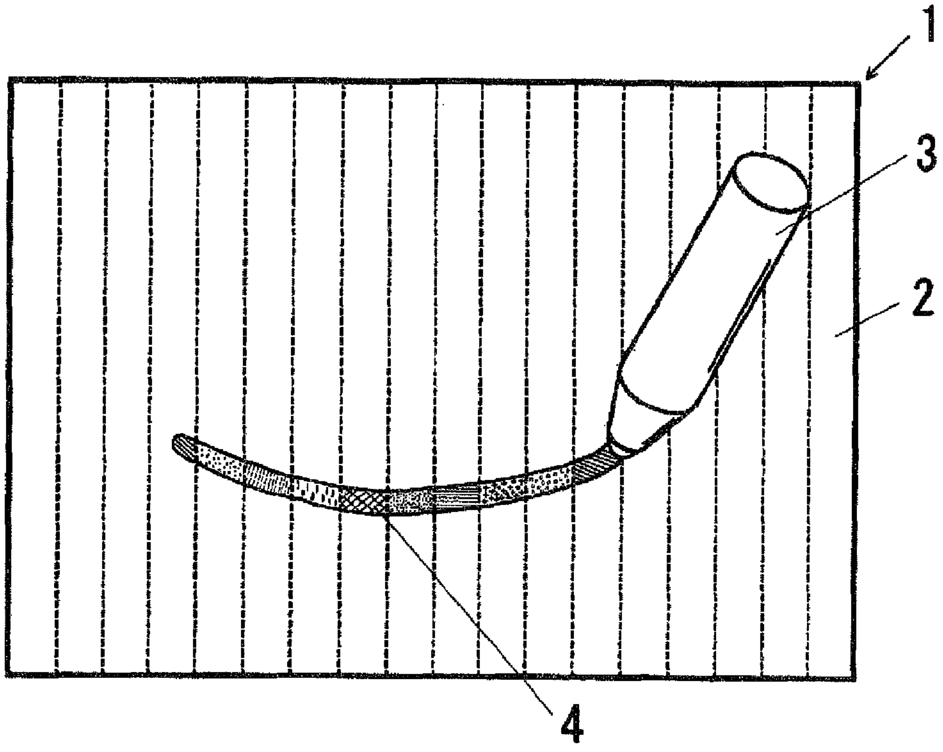
FIG. 3 illustrates another embodiment of the water-discoloring drawing toy of the invention, and shows the state of an image produced with a writing utensil.

Example 4 (see FIG. 3)

Non-discoloring inks (inks prepared by dispersing a color pigment having an average particle diameter of 0.07 μm in an acrylic resin emulsion) of transparent blue, yellow, and pink colors were used, either alone or as a mixture thereof, to form strip-form non-discoloring images in stripe pattern arrangement on the upper surface of a white T/C broad cloth (lightness, 9.2) as a substrate. The non-discoloring images formed were closely disposed, strip-form images each having a width of 0.8 cm.

The strip-form non-discoloring images were purple (lightness, 4.5), blue (lightness, 4.2), blue-green (lightness, 5.0), green (lightness, 6.0), yellow-green (lightness, 7.0), yellow (lightness, 9.1), orange (lightness, 5.9), red (lightness, 5.0), and red-purple (lightness, 4.7) images, and the boundaries between the adjoining images were constituted of dot gradation.

Subsequently, a white screen printing ink prepared by evenly mixing, with stirring, 15 parts of wet-process silicic acid [trade name, Nipsil E-200; manufactured by Nippon Silica Industrial Co., Ltd.], 30 parts of a urethane emulsion [trade name, Hydran HW-930; manufactured by Dainippon Ink & Chemicals, Inc.; solid content 50%], 40 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface with a 100-mesh screen printing plate. The ink applied was dried and cured at 130° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including purple, blue, blue-green, green, yellow-green, yellow, orange, red, and red-purple areas connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of an acrylic resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 1 cm is visually recognized.

Furthermore, as the porous layer dries, the image becomes invisible. When water is adhered to the porous layer again, a multicolor image is visually recognized.

Figure 4:
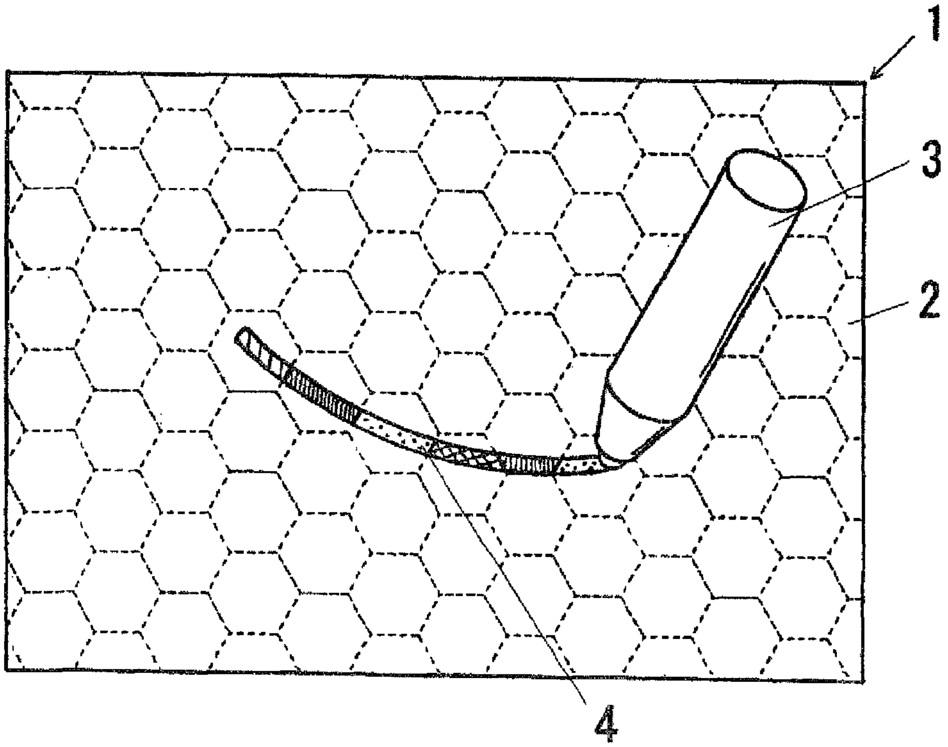
FIG. 4 illustrates another embodiment of the water-discoloring drawing toy of the invention, and shows the state of an image produced with a writing utensil.

Example 5 (see FIG. 4)

Non-discoloring inks (inks prepared by dispersing a color pigment having an average particle diameter of 2.0 μm in an ultraviolet-curable acrylic resin) of blue, green, orange, and red colors were used to print regular hexagons (maximum outer diameter, 1.5 cm) of the different color tones on the upper surface of a white synthetic paper having a thickness of 200 μm (lightness, 9.1) as a substrate so that the regular hexagons adjoined each other to thereby form polygonal non-discoloring images in honeycomb arrangement.

The parts respectively bearing the blue non-discoloring image, green non-discoloring image, orange non-discoloring image, and red non-discoloring image had lightnesses of 4.0, 5.9, 6.0, and 5.0, respectively.

Subsequently, a white screen printing ink prepared by evenly mixing, with stirring, 15 parts of wet-process silicic acid [trade name, Nipsil E-200; manufactured by Nippon Silica Industrial Co., Ltd.], 50 parts of a urethane emulsion [trade name, Hydran HW-350; manufactured by Dainippon Ink & Chemicals, Inc.; solid content 30%], 40 parts of water, 0.5 parts of a silicone antifoamer, 3 parts of a thickener for water-based inks, 1 part of ethylene glycol, and 3 parts of an isocyanate crosslinking agent was used to conduct solid printing on the whole surface with a 100-mesh screen printing plate. The ink applied was dried and cured at 70° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including areas of different color tones, i.e., blue, green, orange, and red, connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of an olefin resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 0.7 cm is visually recognized.

Furthermore, as the porous layer dries, the multicolor image becomes invisible. When water is adhered to the porous layer again, a multicolor image is visually recognized.

Figure 5:
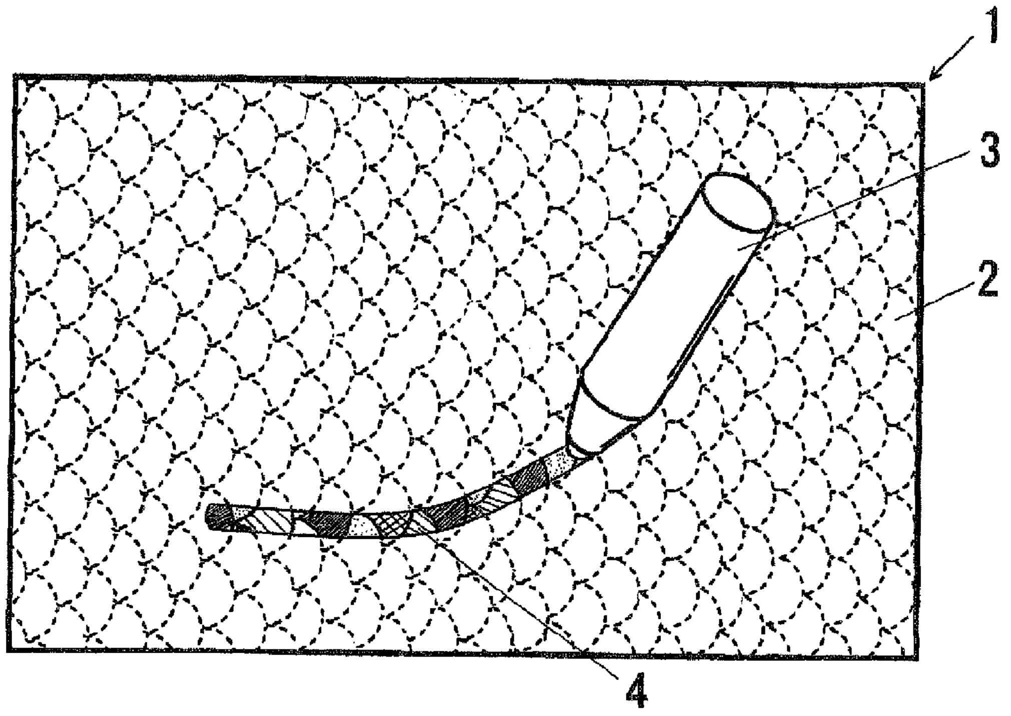
FIG. 5 illustrates another embodiment of the water-discoloring drawing toy of the invention, and shows the state of an image produced with a writing utensil.

Example 6 (see FIG. 5)

Non-discoloring inks (inks prepared by dispersing a color pigment having an average particle diameter of 2.0 μm in an ultraviolet-curable acrylic resin) of blue, green, orange, and red colors were used to form imbricate non-discoloring images of the different color tones on the upper surface of a white synthetic paper having a thickness of 200 μm (lightness, 9.1) as a substrate.

The non-discoloring images each had a size not larger than 5 cm×5 cm at the most, and each image always had overlaps with adjoining images. The blue non-discoloring image, green non-discoloring image, orange non-discoloring image, and red non-discoloring image had lightnesses of 4.0, 5.9, 6.0, and 5.0, respectively.

Subsequently, a white screen printing ink prepared by evenly mixing, with stirring, 15 parts of wet-process silicic acid [trade name, Nipsil E-200; manufactured by Nippon Silica Industrial Co., Ltd.], 50 parts of a urethane emulsion [trade name, Hydran HW-350; manufactured by Dainippon Ink & Chemicals, Inc.; solid content 30%], 40 parts of water, 0.5 parts of a silicone antifoamer, 3 parts of a thickener for water-based inks, 1 part of ethylene glycol, and 3 parts of an isocyanate crosslinking agent was used to conduct solid printing on the whole surface with a 100-mesh screen printing plate. The ink applied was dried and cured at 70° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including areas of different color tones, i.e., blue, green, orange, and red, connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of an olefin resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 0.5 cm is visually recognized.

Furthermore, as the porous layer dries, the multicolor image becomes invisible. When water is adhered to the porous layer again, a multicolor image is visually recognized.

Figure 6:
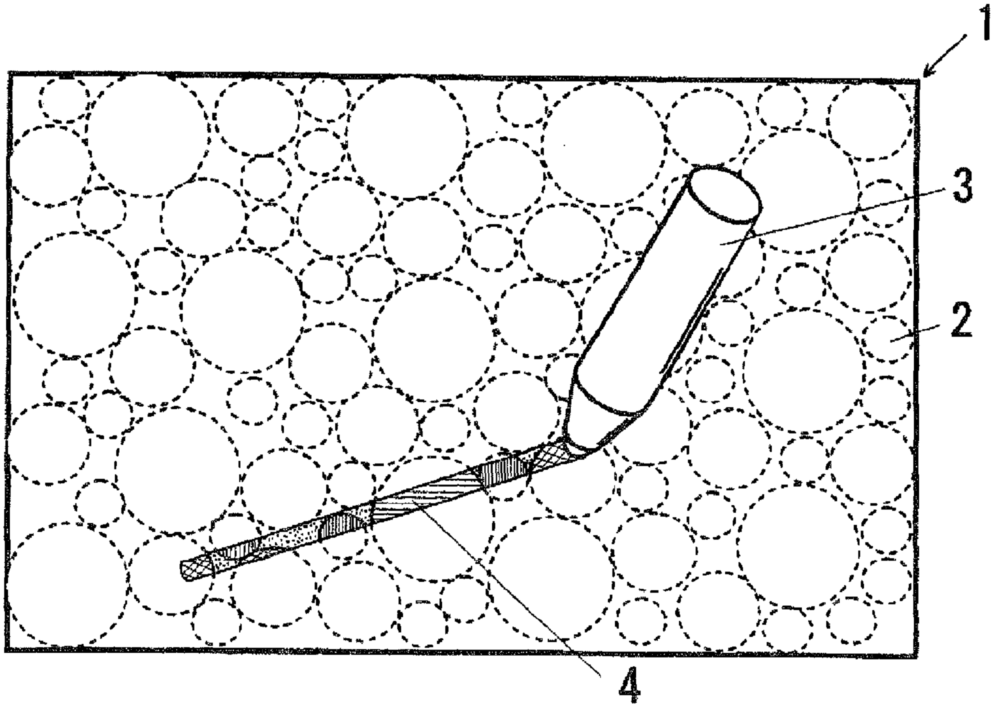
FIG. 6 illustrates another embodiment of the water-discoloring drawing toy of the invention, and shows the state of an image produced with a writing utensil.

Example 7 (see FIG. 6)

Non-discoloring inks (inks prepared by dispersing a color pigment having an average particle diameter of 0.1 μm in an acrylic resin emulsion) of blue, green, orange, and red colors were used to form a blue non-discoloring background image and polka-dot non-discoloring images of green, orange, and red colors on the surface of a white T/C broad cloth (lightness, 9.5) as a substrate.

The polka-dot non-discoloring images each had a diameter of up to 10 cm at the most, and each image always had overlaps with adjoining images. The blue non-discoloring image, green non-discoloring image, orange non-discoloring image, and red non-discoloring image had lightnesses of 4.0, 5.9, 6.0, and 5.0, respectively.

Subsequently, a white screen printing ink prepared by evenly mixing, with stirring, 15 parts of wet-process silicic acid [trade name, Nipsil E-200; manufactured by Nippon Silica Industrial Co., Ltd.], 30 parts of a urethane emulsion [trade name, Hydran HW-930; manufactured by Dainippon Ink & Chemicals, Inc.; solid content 50%], 60 parts of water, 0.5 parts of a silicone antifoamer, 3 parts of a thickener for water-based inks, 1 part of ethylene glycol, and 3 parts of an isocyanate crosslinking agent was used to conduct solid printing on the whole surface with a 100-mesh screen printing plate. The ink applied was dried and cured at 130° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil charged with water was applied to the porous layer. Upon the application, this part of the porous layer became transparent and a multicolor image (drawing) including areas of different color tones, i.e., blue, green, orange, and red, connected in series appeared.

In this drawing toy, the image becomes invisible as the porous layer dries. When water is adhered to the porous layer again, a multicolor image is visually recognized.

The water-discoloring drawing toy was combined with, as a water application device, a writing utensil comprising a fibrous writing tip part made of an olefin resin and a barrel capable of holding water therein. Thus, a water-discoloring drawing toy set was obtained.

In this water-discoloring drawing toy set, when the writing utensil containing water is used to make a drawing on the porous layer, a multicolor image (drawing) having a width of 3 cm is visually recognized.

Furthermore, as the porous layer dries, the multicolor image becomes invisible. When water is adhered to the porous layer again, a multicolor image is visually recognized.

Figure 7:
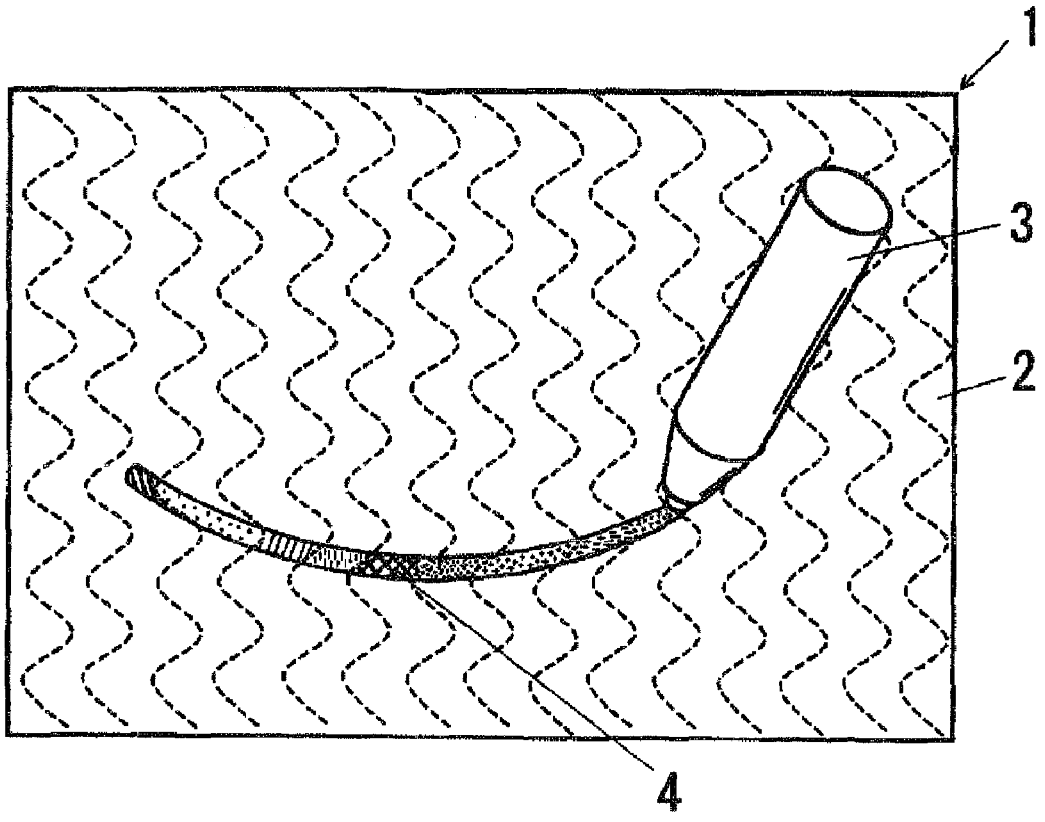
FIG. 7 illustrates another embodiment of the water-discoloring drawing toy of the invention, and shows the state of an image produced with a writing utensil.

Example 8 (see FIG. 7)

Non-discoloring inks (inks prepared by dispersing a color pigment having an average particle diameter of 0.10 μm in an acrylic resin emulsion) of blue, yellow, and pink colors were used, either alone or as a mixture thereof, to form bent strip-form non-discoloring images each having a width of 3 cm in a central part of the upper surface of a white T/C broad cloth (lightness, 9.2) having a size of 80 cm×80 cm as a substrate. The strip-form images were formed so that they adjoined each other and occupied an area having a size of 60 cm×60 cm.

The resultant purple non-discoloring image had a lightness of 4.5, blue non-discoloring image had a lightness of 4.2, blue-green non-discoloring image had a lightness of 5.0, green non-discoloring image had a lightness of 6.0, yellow-green non-discoloring image had a lightness of 7.0, yellow non-discoloring image had a lightness of 9.1, orange non-discoloring image had a lightness of 5.9, red non-discoloring image had a lightness of 5.0, and red-purple non-discoloring image had a lightness of 4.7. The boundaries between the adjoining non-discoloring images were expressed by dot gradation.

Furthermore, characters and a design were printed around the non-discoloring images on the substrate.

Subsequently, a white screen printing ink prepared by evenly mixing, with stirring, 15 parts of wet-process silicic acid [trade name, Nipsil E-200; manufactured by Nippon Silica Industrial Co., Ltd.], 30 parts of a urethane emulsion [trade name, Hydran HW-930; manufactured by Dainippon Ink & Chemicals, Inc.; solid content 50%], 40 parts of water, 0.5 parts of a silicone antifoamer, 3 parts of a thickener for water-based inks, 1 part of ethylene glycol, and 3 parts of a blocked isocyanate crosslinking agent was used to conduct solid printing on the whole surface with a 100-mesh screen printing plate. The ink applied was dried and cured at 130° C. for 5 minutes to form a porous layer 2. Thus, a water-discoloring drawing toy 1 was obtained.

When the porous layer was in a dry state, the drawing toy had a white color and the non-discoloring images were prevented from being visually recognized. Subsequently, a writing utensil 3 charged with water was applied to the porous layer. Upon the application, this part of the porous layer became transparent and a multicolor image 4 (drawing) including purple, blue, blue-green, green, yellow-green, yellow, orange, red, and red-purple areas connected in series appeared.

In this drawing toy, the image becomes invisible as the porous layer dries. When water is adhered to the porous layer again, a multicolor image is visually recognized.

The water-discoloring drawing toy was combined with, as a water application device, an applicator equipped with a brush having a width of 10 cm. Thus, a water-discoloring drawing toy set was obtained.

In this water-discoloring drawing toy set, when the applicator in which the brush has been soaked with water is used to make a drawing on the porous layer, a multicolor image (drawing) having a maximum width of 10 cm is visually recognized.

Furthermore, as the porous layer dries, the image becomes invisible. When water is adhered to the porous layer again, a multicolor image is visually recognized.

While the invention has been described in detail and with reference to specific embodiments thereof, it will be apparent to one skilled in the art that various changes and modifications can be made therein without departing from the scope thereof.

This application is based on Japanese patent application No. 2006-37332 filed on Feb. 15, 2006, and on Japanese patent application No. 2007-18722 filed on Jan. 30, 2007, the entire contents thereof being hereby incorporated by reference.

What is claimed is:

1. A water-discoloring drawing toy having such a constitution that a drawing made by applying a writing utensil or applicator for water adhesion produces a multicolor image, the drawing toy comprising:

a substrate;

a plurality of non-discoloring images disposed on the substrate, each image differing in color tone and adjoining each other so that at least two color tones of the non-discoloring images per 100 $cm^2$ can be visually recognized when the writing utensil or applicator for water adhesion applies to the toy, wherein the non-discoloring images each contain colorants that are color pigments having a particle diameter of 0.01-10 μm; and a porous layer for preventing the non-discoloring images from being seen in the ordinary state, the porous layer being disposed over the non-discoloring images and comprising a binder resin and a low-refractive-index pigment fixed therein in a dispersed state, the porous layer having a difference in transparency between a liquid-impregnated state and an unimpregnated state;

wherein the non-discoloring images are of a strip-form having a width of 0.3-5 cm, the strip-form non-discoloring images are nonlinear, and the lightness $V_B$ of the substrate is 8.0 or higher and the relationship between the lightness of the substrate ($V_B$) and the lightness of each individual non-discoloring image ($V_C$) satisfies $V_B - V_C > 0$.

2. A water-discoloring drawing toy set which comprises a water-discoloring drawing toy and a writing utensil or applicator for water adhesion, wherein the water discoloring drawing toy has such a constitution that a drawing made by applying the writing utensil or applicator for water adhesion produces a multicolor image;

wherein the drawing toy comprises:

a substrate;

a plurality of non-discoloring images disposed on the substrate, each image differing in color tone and adjoining each other so that at least two color tones of the non-discoloring images per 100 $cm^2$ can be visually recognized when the writing utensil or applicator for water adhesion applies to the toy; wherein the non-discoloring images each contain colorants that are color pigments having a particle diameter of 0.01-10 μm; and a porous layer for preventing the non-discoloring images from being seen in the ordinary state, the porous layer being disposed over the non-discoloring images and comprising a binder resin and a low-refractive-index pigment fixed therein in a dispersed state, the porous layer having a different transparency between a liquid-impregnated state and an unimpregnated state, and wherein the non-discoloring images are of a strip-form having a width of 0.3-5 cm, the strip-form non-discoloring images are nonlinear, and the lightness $V_B$ of the substrate is 8.0 or higher and the relationship between the lightness of the substrate ($V_B$) and the lightness of each individual non-discoloring image ($V_C$) satisfies $V_B - V_C > 0$.

3. The water-discoloring drawing toy set according to claim 2, wherein the writing utensil or applicator employs as a writing tip member a porous plastic object having interconnected pores or an object formed by fiber processing.

4. The water-discoloring drawing toy set according to claim 2 or 3, wherein the writing utensil or applicator, when applied, gives a drawing which has a width in the range of 0.3-15 cm.

* * * * *